United States Patent [19]

Rinn et al.

[11] Patent Number: 4,465,349
[45] Date of Patent: Aug. 14, 1984

[54] MICROFILM CARD AND A MICROFILM READER WITH AUTOMATIC STAGE POSITIONING

[75] Inventors: Jürgen Rinn, Launsbach; Fritz Belitz, Giessen-Kleinlinden, both of Fed. Rep. of Germany

[73] Assignee: Minox GmbH, Giessen, Fed. Rep. of Germany

[21] Appl. No.: 348,241

[22] Filed: Feb. 12, 1982

[51] Int. Cl.³ ............................................. G03B 23/12
[52] U.S. Cl. ...................................... 353/25; 353/120
[58] Field of Search ...................... 353/25, 26 R, 26 A, 353/27 R, 27 A, 120; 235/454, 456; 250/555, 566, 568–570

[56] References Cited

U.S. PATENT DOCUMENTS 3,290,987 12/1966 James et al. ...................... 353/26 A
4,254,329 3/1981 Gokey et al. .................. 353/27 A X

FOREIGN PATENT DOCUMENTS 1396879 6/1975 United Kingdom ............. 353/27 A
2058399 4/1981 United Kingdom ............. 353/26 A

*Primary Examiner*—Harry N. Haroian
*Attorney, Agent, or Firm*—Wells & Wells

[57] ABSTRACT

A microfiche and a microfilm reader comprising automatic positioning of the film stage, characterized by the following features:

(a) the microfiche (MFK) is provided with an index (2) of the information present in its individual images and of their x,y coordinates in optically coded form and with a timing track (4), (b) the reader comprises a read head (19) with electronic-optical sensors to read the optically coded index on the microfiche (MFK), (c) an electronic read/write memory (20) for storing the index (2) is connected to the read head (19), (d) provision is made for an alphanumeric keyboard (27) to feed-in a search concept (search key) and followed by an encoder (26) and a register (25) for storing the coded keyboard input, (e) a comparator (24) is connected to the memory (20) of the index (2) and the register (25) of the coded keyboard input, which determines the agreement between the search key and a concept present in the index, (f) the comparator (24) and the memory of the index are followed by appropriate switching means (28;29;30;31;40;41) which in turn are followed each by a digital/analog converter (32;33) to generate each an analog DC potential corresponding to the x and y coordinates respectively of the film image containing the search key, (g) a follow-up circuit consisting of a DC motor (36;37), a servo-potentiometer (38;39) and a differential amplifier (34;35) is provided for each coordinate for the purpose of positioning the film stage and is fed with the DC potential at the outputs of the analog/digital converters (32;33).

15 Claims, 5 Drawing Figures

MICROFILM CARD AND A MICROFILM READER WITH AUTOMATIC STAGE POSITIONING

The invention concerns a microfiche and a microfilm reader with automatic film-stage positioning so designed that the image of the fiche containing the looked-for data automatically moves into the projection beam.

It is already known with respect to microfilm readers to displace the film stage along the x and y coordinates by a motor means connected to a preselection device. In this manner it is possible to let the film stage move automatically into the x and y position fed to the preselection device and hence to display automatically the desired image of the fiche on the reader's ground glass screen (German Offenlegungsschrift No. 25 45 499).

This requires however knowing beforehand on which of several fiches and in which of the numerous images of the right fiche the desired information will be found, and what its coordinates are. This means that the proper use of the known system requires pre-knowledge of the x-y coding of the desired data.

Based on this state of the art, it is the object of the invention to create an apparatus consisting of a microfiche and a microfilm reader wherein automatic positioning of the microfiche will also be possible when only the keyword of the desired information, but not its x-y array on the fiche is known.

In conformity with the invention, this problem is solved by a system consisting of a microfiche and a pertinent microfilm reader which evinces the characteristics stated in the claims.

The apparatus designed in conformity with the invention essentially consists of a microfiche with an index in optically coded form, a read-head and a memory to read and store the index, a keyboard followed by an encoder for the input of a search concept or search key to ascertain the agreement between the search key with a concept present in the index, and also means for positioning the film stage.

Whenever the microfiche is changed, the associated index is automatically recorded into the memory and is immediately available for the search procedure. Especially when several microfiches are needed for the total collection of data, this is advantageous in that no further operations are required when changing the microfiche.

If data must be changed, one or more new microfiches will be set up. The changes and any new distribution of the data on the individual images of the microfiche are then taken into account in the index. After exchanging the old microfiche for a new one the system is at once operative again.

If however the entire collection of data is stored on several microfiches, it is a drawback that several or even all microfiches must be produced anew because of overall relatively small changes.

Accordingly the invention in a further embodiment provides means for reading at least a second microfiche in the reader and contains all the changes in a bounded volume of data.

These means are followed by an additional store-read memory to store the index of the second microfiche.

Provision is made for an additional comparator to ascertain the agreement between the search key and a key present in the index of the second microfiche, and for switching means effecting such a logic linkage between the additional read/write memory and the additional comparator on one hand and the alphanumeric keyboard and the means for the film stage positioning on the other that after the input of the search key the second microfiche will be projected while the old microfiche is projected only when the search key is absent from the additional read/write memory.

These logic switching means consist of AND or OR gates arranged between the read/write memories, the comparators and the coordinate storages.

A special key is provided in the keyboard for changing the second microfiche. This key is followed by a read-only memory with the stored coordinates for the positioning of the film stage to change the second microfiche. When this special key is actuated, these coordinates are fetched from the read-only memory and the film stage is positioned correspondingly.

The invention outlined above on one hand reduces the costs of setting up new microfiches and on the other hand eliminates the frequent exchanging of the old microfiches for new ones.

The second microfiche is so designed that a given area in it is assigned to each of the already present microfiches requiring modification. The modified data are again listed in alphabetical or numerical sequence in this area. The identifying numeral of the associated old microfiche is assigned to each area in the optically coded index of the second microfiche.

Because the placing of any old microfiche into the read/write memory results in storing its identifying numeral, this numeral can be used for direct access to the associated memory of the second microfiche. By means of suitable logic connections, a higher priority is provided to the storage area in the index of the second microfiche than to the index of the corresponding old microfiche.

With the input of a search key through the keyboard, there is a parallel (simultaneous) action with the search in the index of the old microfiche under its identifying numeral whether there is a modification under this search key. If this is the case, the image coordinates of the modified information from the second microfiche are transmitted to the position control of the film stage on account of the higher priority. If there is no information under the fed search key in the second microfiche, the film stage will be positioned according to the coordinates of the old microfiche.

BRIEF DESCRIPTION OF THE DRAWINGS

The invented system is shown in the drawing in the form of an embodiment.

STRUCTURE OF THE MICROFICHE

Figure 1:
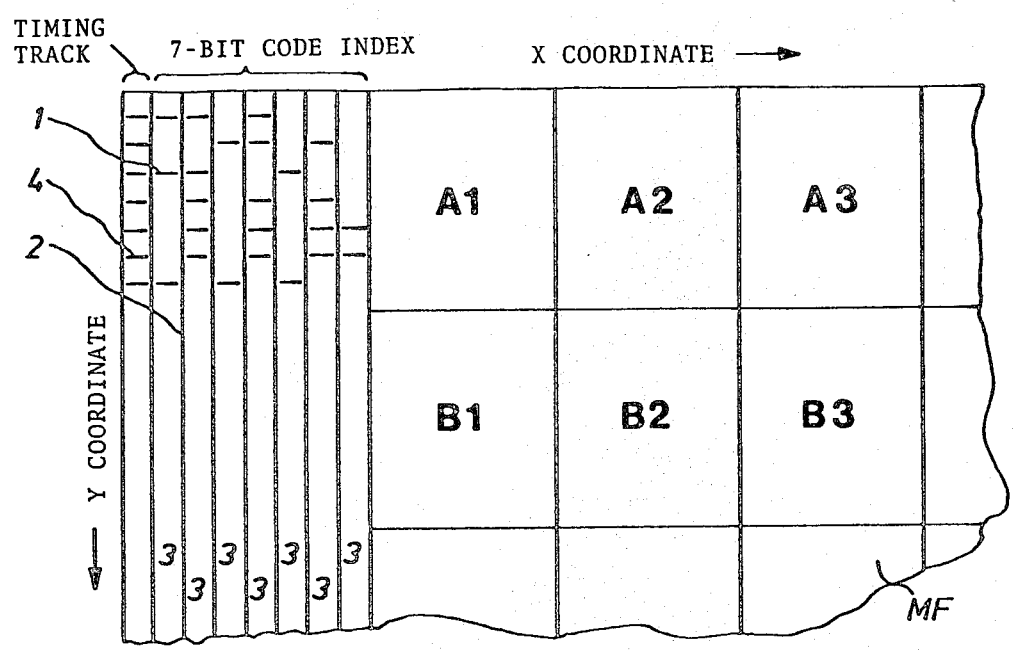
FIG. 1 is a cut-out of a microfiche with an index deposited on it in optically coded manner.

The microfiche is denoted by MF in FIG. 1, and comprises on it the individual images A1, A2 etc, B1, B2 etc. Only a cut-out is shown schematically of this fiche.

The microfiche MF divided into rows and columns contains the index 2 in optically coded form. The code used is a binary code for alphanumeric characters and special symbols, for instance the ASCII code. The code is flashed in the form of dark or bright dashes 1 and depending on the nature of the film positively or negatively into the microfiche. The coded index 2 is appropriately arranged in the form of a strip selectively in the direction of the y coordinate (FIG. 1) or also in the direction of the x coordinate parallel to one side edge on the microfiche. Illustratively one row, or as shown in FIG. 1, one column of the microfiche may be provided for the index.

In the present example only one track with seven channels 3 for the binary code is placed in this strip. If the indexes have a high information content several tracks may also be provided, each with seven channels and parallel to one another. In addition to the code proper, another channel, namely a timing track 4 with alternatingly light and bright dashes is provided to generate timing pulses.

The index creates the allocation of iIllustratively alphabetically listed keys to the particular image x and y coordinates. For every individual image contained in the microfiche, the index contains at least one "word" consisting for instance of six or eight characters. This "word" for instance may be the first or last key listed in the alphabetical sequence on the particular individual image; however it may also concern a combination of keys and numbers or a pure combination of numbers. The coordinates of the microfilm image related to each "word" are contained in the index.

Furthermore, the index contains further data of the microfiche in coded form, for instance the information of the x and y scale factor, the reduction factor, date of preparation, film reference numeral and the number of the microfiches belonging to one object.

The structure of the optic code for the index corresponds as regards the spacings and the boldness of the dashes, approximately to the boldness of the script contained in the microfiche, whereby for the same magnification, the code can be read the same way as the script.

READING THE INDEX

The optically coded index of the microfiche is ready by a read head (19) in the enlarged image in the vicinity of the plane reader ground glass screen (10). The back magnification in this plane is large enough that the code can be read therein with conventional electro-optical sensors, for instance silicon photodiodes. The read-head reads all channels 3 of the code in one track at the same time (in parallel). At least one photodiode is mounted in the read-head per channel.

Figure 2:
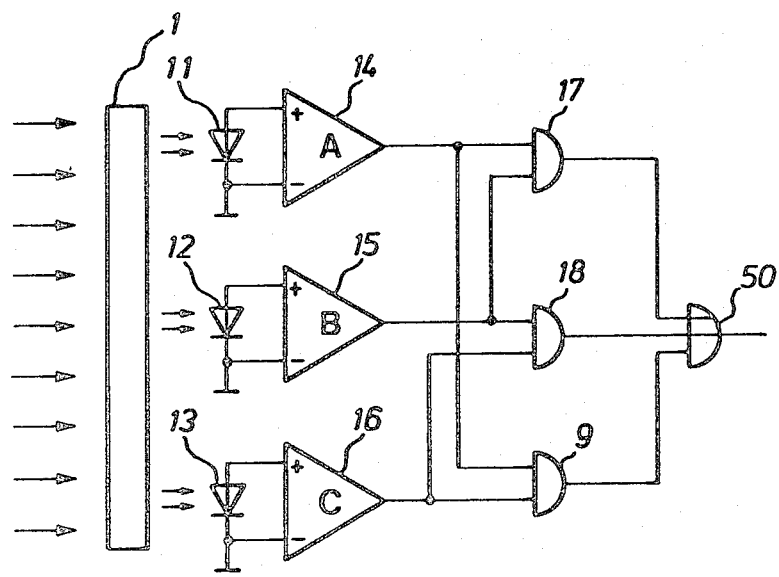
FIG. 2 is the circuit diagram of a read-head to read one channel of the optically coded index.

Due to the high back magnification, difficulties may arise in practice due to scratches or dust particles in the film when reading the light-dark dashes 1. As shown in FIG. 2, each dash therefore is simultaneously recorded by three photodiodes.

In this instance the light illustratively is incident on the bright dash 1 of the code and on the photodiodes 11,12,13. These are each connected to the input terminals of the voltage comparators 14,15,16. Upon incidence of the light on the photodiodes, a signal is generated at the output of the comparators. The outputs of the comparators are so connected together by a coincidence circuit with the AND gates 17,18,9 and the OR gate 50 so that a signal appears at the output of the OR gate only when the dash 1 of the code has been simultaneously detected by two photodiodes. In this manner minor interferences caused by scratches or dust particles when reading the code will be suppressed.

Figure 3:
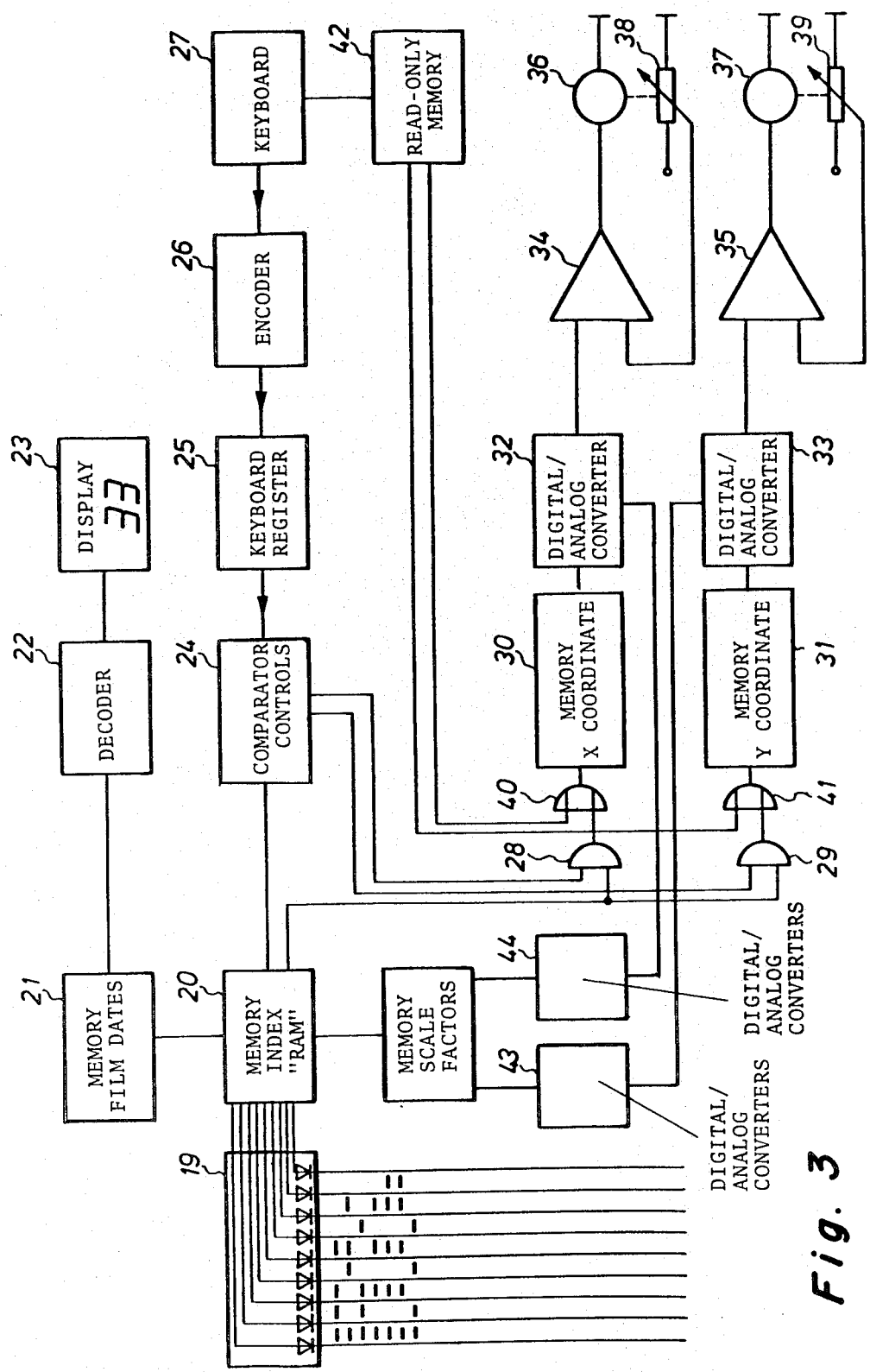
FIG. 3 is a block-circuit diagram of the reader to search a specific information in the microfiche using the alphanumeric keyboard.

The actual reading of the index is carried out by moving the code past the spatially fixed read-head 19. To that end, the omitted film stage of the reader into which the microfiche with the coded index was inserted, will be moved by a motor means into the channel direction of the code whereby the code—which is magnified by the reader optics—passes over the read head 19 (FIG. 3). Due to the additional timing track 4 with alternating dark and bright dashes, a timing pulse is generated for each code character to control the read-in to an electronic read-write memory 20.

In practice, the read-in of the index can be coupled with the film change procedure by the reader's operating program. Because the film stage must be moved into special position to change the film so as to be partly outside the reader, the resumption by the film stage of a reading position can be made simultaneous with the read-in of the index. In this manner each film change is followed by reading-in the pertinent index which then is at once available for further use. The code for the remaining data of the film also is read-in with the index.

STORING THE INDEX

An electronic read/write memory 20, preferably a random-access-memory (RAM) is provided in the reader to store the binary coded index (FIG. 3). For instances 8 bits=1 byte are available for each character in the memory 20. For each concept or "word" contained in the index, for instance 6 bytes are provided in the memory, of which 1 byte each for the x and y coordinates. The individual memory cells of the memory 20 can be selected through address inputs. The write-in of the index begins with a specific memory cell. Due to the timing pulse, the address is raised by 1 after each written-in character. At the end of the character sequence representing a "word", a special symbol "end of word" is written in. At the end of the entire microfiche index, a special symbol "end of fiche" is written in. Thereupon the binary coded additional data of the microfiche are written into special memory areas, for instance a memory 21 for the film data and a memory 42 for the scale factors. The data of interest to the system user are decoded by a decoder 22 and shown on a display 23.

The scale factors for the image grid are analyzed directly to control the image step in the x and y direction. In similar manner as concerns readers with two or more magnification factors, the statement of the microfiche reduction factor can be used to automatically switch the reader to the proper magnification factor.

The read/write memory 21 can also be made large enough that the indexes of several fiches can be stored simultaneously. In that case only the identifying numeral need being read-in with every change of film. This value then selects the memory area for the associated index.

INFORMATION SEARCH

To search for the desired information, the search key is fed into an alphanumerical keyboard. The input key or concept is coded in an encoder 26 in the same code as is present in the index (for instance the ASCII code) and is deposited in a register 25 for the keyboard input. The inputs of the keys or concepts appropriately take place in the same format as for the "word length" being also used in the index.

The ensuing search for instance can be implemented in that the word written into the keyboard register 25 is compared by a comparator 24 known per se and not described further in stepwise manner with the "words" in the index. The procedure begins with the highest-value character in the keyboard register 25, that is, with the initial letter or the first digit of the search key. This character is compared by the comparator 24 with the first character of the first word in the index. If there is no agreement, the comparison continues with the first character of the second word in the index, etc. The beginning address for the individual "words" in the memory 20 is increased each time by the "word length"=8. This procedure continues until there is agreement between the first character of the keyboard register 25 and the first character of a "word" in the index.

Next the agreement also for the second character etc. must be ascertained. To that end the second character of the keyboard register is compared with the particular second character of the words in the index. This procedure begins with the second character of the "word" for which agreement already was found in the first character, that is, with the beginning address of this "word" raised by 1. If no agreement is found, the comparison must be continued with the particular second characters of the following words, the address being raised by 8 with every step. This procedure is carried on with the third and further characters until maximum agreement has been found.

In many cases however no complete agreement between the search key in the keyboard register 25 and a "word" of the index in the memory 20 will be obtained because the index only contains the particular first "word" of a full microfiche page. A decision must therefore be made in every case whether the "word" in the keyboard register for which no full agreement is possible is in alphabetical or numerical sequence before or after a "word" in the index.

The comparison procedure for each character is implemented for instance by subtracting the character in the index and in the ASCII code from the corresponding character in the keyboard register. This code is so constructed that a character which is subsequent in the alphabet has a higher binary value than a leading character, just as a higher number has a higher binary value than a lower one. In this manner the subtraction results in a positive value if the character in the keyboard register follows the character in the index. Only in such a case will the particular address be raised by 8 and the comparison with the corresponding character of the next word be repeated. If the difference "0" is obtained in the subtraction, there is agreement.

If no agreement can be reached, a negative difference will be obtained for a given step in the subtraction. This means that the particular character comes later in the sequence in the index than the corresponding character of the search key in the keyboard register. Because the "words" in the index always represent the beginning of a page, this means that the key or concept looked for will be found on the previous page. When a negative difference occurs, the address must therefore be lowered again by 8.

Basically non-agreement can take place for any character of a "word", but most of the time it takes place for low-value characters.

The search procedure terminates when agreement has been reached or when following non-agreement the address has been reduced by 8. The coordinates of the associated micro picture in the fiche are contained within the "word" so found, for instance the x coordinate as the 7th character and the y coordinate as the 8th character. These values are fetched consecutively from the memory 20 by corresponding addressing and are transferred through the gates 28 and 29 into the intermediate memories 30 and 31 each for the x and y coordinate. The coordinates here are permanently available for further positioning of the film stage.

POSITIONING THE FILM STAGE

To position the film stage on the looked-for individual image, provision is made for instance of a DC motor 36,37 and a servo-potentiometer 38,39 as a follow-up control for each coordinate. The binary coded coordinates must be first converted into a DC potential corresponding to the film stage position for that control. This is implemented using the digital/analog converters 32,33 of which the resolution and the linearity must be matched to the number of possible individual images in the microfiche and to the required accuracy of positioning. The digital/analog converters have a DC output which corresponds to the nominal position of the film stage.

The output potential of the digital/analog converters is obtained by multiplying the binary value applied to the inputs by a given reference potential. This reference potential can be generally varied continuously using a variable resistor. In this manner the potential jump which obtains at the output when the binary value is increased by 1 can be set continuously and therefore any arbitrary film-stage step can be achieved.

In order to account in a simple manner for the various scale factors of different microfiches, one may for instance control the reference potential of the digital-/analog converters to correspond to the required film-stage step. The generation of this reference potential is appropriately achieved thereupon with further digital-/analog converters 43,44 which receive as their input signal the binary coded scale-factor of the microfiche. The output potential of these digital/analog converters 43,44 driven with a fixed reference potential then corresponds to the spacing between the images on the microfiche in the x and y directions.

In view of the high resolution of the digital/analog converters, it is possible to vary the film-stage step in very fine amounts of for instance 1/100 mm. By multiplying the potential values corresponding to the steps of the film-stage in the x and y directions by the binary coordinate values, one obtains at the outputs of the digital/analog converters 32,33 the potentials corresponding to the nominal positions in the x and y directions.

The wipers of the servo-potentiometers 38,39 are mechanically coupled to the motion of the film stage. The potential at the wipers therefore corresponds to the particular actual position of the film stage.

The potentials for the nominal and actual positions relating to each coordinate are fed to the input terminals of each of the differential amplifiers 34,35. If there is a difference between the nominal and actual potentials, a potential appears at the output of the amplifier with a polarity corresponding to the direction of the deviation. These potentials are fed to each of the DC motors 36,37 of which the directions of rotation are so determined that they will move the film stage to decrease the difference between the nominal and the actual positions.

Each motor moves the film stage until the difference between the two potentials has become null, that is, until the nominal position of the film stge has been reached.

CHANGEOVER CONTROL

To change the microfiche MF it is necessary to move the film stage into a special position. To that end, a separate key "change film" is provided at the keyboard 27. When this key is actuated, the coordinates stored in a read-only memory 42 are fetched for the film-change position and transferred through the OR gates 40,41 to the memories 30,31 for the x and y coordinates. The data previously stored therein are erased, whereby the film stage at once moves into the film-changing position.

After the changeover, the search key or concept can be at once fed into the keyboard 27. The end position for the read-in of the index is fetched from the read-only memory 42 at the first input pulse for an arbitrary character and transferred to the memories 30 and 31. The index is read on the way from the film changeover position to this end position and transferred to the read/write memory 20.

During this procedure the key search can be further fed to the keyboard. When the input is terminated, the index as a rule will also be entirely stored and the character "end of fiche" will have been reached. In this manner the search and the positioning are made possible practically without additional time delay. After completion of a search, the coordinates remain in the memories 30 and 31 until a new search key is applied, that is, the film stage will remain in its old position until that time.

For a new input, first only the keyboard will be erased. The input must be in the specified number of characters, for instance six, or else, for shorter search keys, a key "end of input" must be actuated. Only then does the search in the index begin with a subsequent transmission of the new image coordinates to the memories 30 and 31.

The read/write memory 20 is supplied from a battery or a charged capacitor in case of line failure or during transient shut-off of the system so that by means of the potential so applied the stored index shall remain preserved.

READ-IN OF CHANGES

Figure 4:
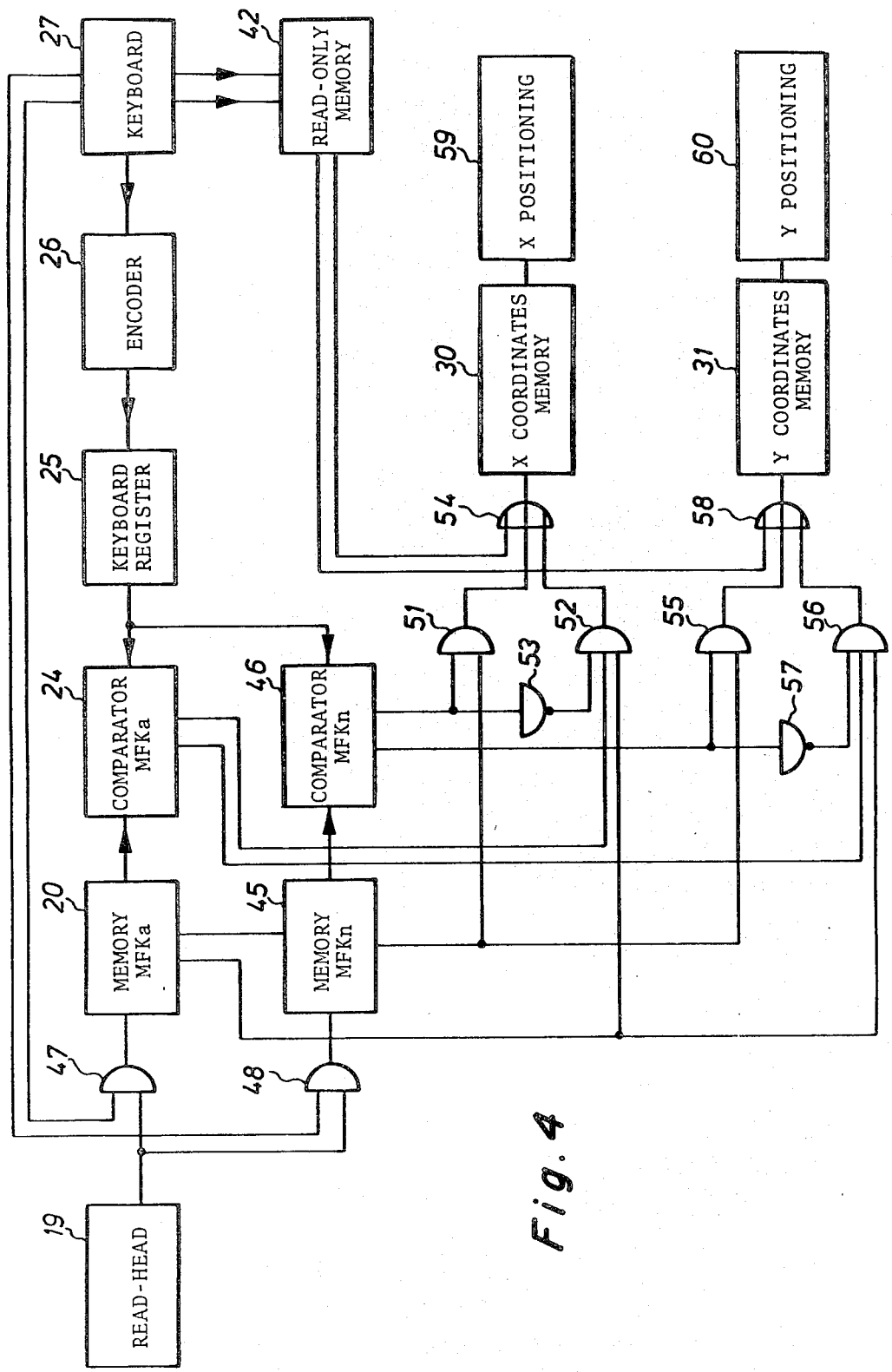
FIG. 4 is the block circuit diagram of a reader with means for reading a microfiche containing modifications.
Figure 5:
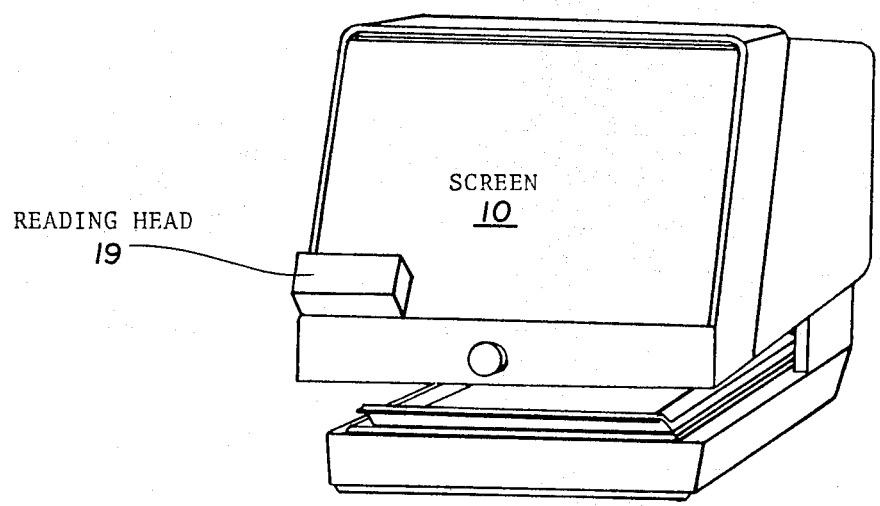
FIG. 5 is a perspective view of the reading head mounted in the vicinity of the ground glass screen.

FIG. 4 shows the circuit diagram of a reader complemented by a device making it possible to read a second new microfiche (MFn) which contains the changes in the old microfiche (MFo).

In this further developed system, the alphanumeric keyboard 27 in addition to the key "change film" for the old microfiche MFo also contains a key "change film n" to change the second, new microfiche MFn. When this key is actuated the coordinates stored in the read-only memory 42 for the film-change position of MFn, which need not coincide with the film-change position of MFo, are fetched and transmitted through the OR gates 54,58 to the memories 30,31 for the x and y coordinates. Thereupon the film stages moves into the change position for MFn.

After the MFn has been inserted, the index of the MFn will be read by the read head 19 upon the next actuation of the keyboard 27. As only one read head is present for the indexes of the MFo and MFn, the corresponding memory 20 or 45 will be selected by the AND gates 47 or 48, depending on which film-change key was actuated. Thusly, the index of the MFn is written into the memory 45 through the gate 48.

The selection of the particular proper memory also can take place automatically by a code on the microfiche from which a signal then is derived which will be fed to the gates 47 and 48 in lieu of the film-change key signals.

It is possible now to feed a search key through the keyboard 27 and the encoder 26 into the register 25. The output of this register is connected to the components 24 and 46. The comparator 24 compares the content of the register 25 with the index of the MFo recorder into the memory 20. At the same time the comparator 46 compares the contents of the register 25 with the index of the MFn recorded in the memory 45. As a result, the identifying numeral of the MFo present in the memory 20 selects the associated memory area in the memory 45.

If now the search key present in the register 25 is found in the memory 45 of the MFn, the comparator 46 will emit a 1-signal to one of the inputs of the AND gate 51. By corresponding addressing, the x coordinate of the associated page in the MFn is fetched from the memory 45 and transmitted through the open gate 51 and the OR gate 54 to the memory 30 for the x-coordinate. The y coordinate is correspondingly transmitted through the gates 55 and 58 into the memory 31.

Using these coordinates, the film stage is then positioned by means of the position controls 59,60.

As the comparator 24 operates simultaneously with the comparator 46, it will also emit a 1-signal to the associated AND gate 52 when the search key is found in the memory 20. Here again the x coordinate of the corresponding side in the MFo is fetched from the memory 20 and transmitted to a second input of the gate 52. However, when the comparator 46 emits a 1-signal, namely when the same search key also was found in the MFn memory 45, then the inverter 53 will apply a 0-signal to a third input of the AND gate 52, whereby this gate remains blocking as regards the coordinate values from the MFKa.

It is only when the output of the comparator 46 remains on the 0-signal, whereby therefore the search key is absent from the MFn, that the inverter 53 will emit a 1-signal to the third input of the AND gate 52, so that the x coordinate of the associated side in the MFo arrives through the AND gate 54 into the memory 30.

Correspondingly, the y coordinate is then transmitted through the gates 56 and 58 into the memory 31. By means of such a connection it becomes possible to allocate a priority to the memory contents of the MFn over the contents of the MFo. If the search key is contained in the MFn, the film stage in any event will be positioned on its coordinates.

As the modified data for a large number of MFo's can be taken into account by a single MFn, it suffices to insert the MFn into the reader to proceed in the conventional manner with the old microfiches.

However the invention is not restricted to readers wherein the MFo must be manually exchanged. Special advantages are obtained from the described device for a fully automatic reader with a magazine for a large number of microfiches which are automatically displaced in the film stage by the keyboard input.

In this case the identifying numeral of the desired microfiche and the search key can be used first to interrogate the memory area of the MFn whether a modification is present under this key or concept. Only when this is not the case will be pertinent MFo be moved into the film stage and will its index be recorded in the read/write memory. The search is then carried out further by the index of this MFo. If on the other hand the search key is found in the index of the MFo, the film stage will be positioned in terms of the coordinates stored therein. The associated MFo in this instance may remain in the magazine.

Such a fully automatic reader with a magazine for several microfiches offers a further advantage in that no separate film stage is required for the MFn, nor any widening of the ordinary film stage. The MFn in this instance can be housed the same way as the other microfiches in a particular position in the magazine. All that is required is that when the MFn is first introduced into the system, its index be transmitted through a single read procedure into the read/write memory.

It is only after the fed-in search key has been found in the stored index of the MFn that the film stage shall be moved and positioned according to the coordinates. Because the decision of moving either the MFn or one of the MFo's into the film stage is made by the system control, operating the system requires no additional effort.

For a larger scope of changes, it is obviously also possible when using a fully automatic system with a magazine for several microfiches to employ more than one MFn.

We claim:

1. A microfiche reader comprising automatic positioning of a film stage, comprising:
   (a) a microfiche is provided with an index of the information present in its individual images and of their x, y coordinates in optically coded form and with a timing track;
   (b) said reader comprises a read head with electronic-optical sensors to read the optically coded index on said microfiche;
   (c) an electronic read/write memory for storing an index is connected to said read head;
   (d) an alphanumeric keyboard is provided to feed in a search concept and is followed by an encoder and a register for storing a coded keyboard input;
   (e) a comparator is connected to said memory of said index and said register of said coded keyboard input, which determines the agreement between said search concept and a concept present in said index;
   (f) said comparator and said memory of said index are followed by appropriate switching means which in turn are followed each by a digital/analog converter to generate each an analog DC potential corresponding to the x and y coordinates respectively of the film image containing said search concept;
   (g) a follow-up circuit consisting of a DC motor, a servopotentiometer and a differential amplifier is provided for each coordinate for the purpose of positioning said film stage and is fed with the DC potential at the outputs of said analog/digital converters; and
   (h) means for reading at least a second microfiche containing all the modifications of a defined volume of data, in that an additional read/write memory for storing an index of said second microfiche follows said means for reading, in that an additional comparator for ascertaining agreement between said search concept and a concept present in said index of said second microfiche is present, and in that switching means for a logic connection of said additional read/write memory and the said additional comparator on one hand and said register of said alphanumeric keyboard and means for film-stage positioning on the other hand are present, in that following an input of said search concept said second microfiche is projected and an old microfiche only then is projected when said search concept is absent from said index of said additional read/write memory.

2. The microfiche reader of claim 1, wherein said read head is mounted in the vicinity of a ground-glass screen of said reader and reading is carried out on a magnified image of said reader.

3. The microfiche reader of claim 1, wherein said index has a plurality of channels and each said channel has a plurality of sensors for reading and each said channel emits a signal only when said plurality of the sensors reading this channel issues a signal.

4. The microfiche reader of claim 1, wherein in addition to said index further data are entered in optically coded form on said microfiche.

5. The microfiche reader of claim 4, wherein said further data are a scale factor.

6. The microfiche reader of claim 4, wherein said further data are a reduction factor.

7. The microfiche reader of claim 5, wherein switching means are provided for the automatic proper adjustment of microfiches having different scales for the corresponding multiplication of said scale factors by image coordinates.

8. The microfiches reader of claim 7, wherein said switching means consist of memory, following said index memory, for storing said scale factors and an analog/digital converter each for the x and y coordinates and having its output connected to said corresponding analog/digital converter for said film-stage positioning.

9. The microfiche reader of claim 6, having a plurality of magnification factors provided with switching means to automatically set a given magnification factor and effecting together with coded data of said reduction factor on said microfiche a setting for said magnification factor.

10. The microfiche reader of claim 1, wherein said memory for said index is followed by a second memory for film data and by a decoder and a display unit.

11. The microfiche reader of claim 1, wherein additionally a read-only memory is provided to position a film-stage in its film-changing position and storing x and y coordinates of said film-changing position, and in that the outputs of said read-only memory are connected through suitable switching means (30; 31; 40; 41) with digital/analog converters (32; 33) controlling said DC motors (36/37).

12. The microfiche reader of claim 11, wherein said read-only memory has an input connected to a keyboard containing a special film-changing key.

13. The microfiche reader of claim 1, wherein a random-access memory is provided as said electronic read/write memory.

14. The microfiche reader of claim 1, wherein switching means for logic connection consist of AND and OR gates mounted between said read/write memories, said comparators and said coordinate memories.

15. The microfiche reader of claim 14, wherein a special key for changing said second microfiche is provided at said alphanumeric keyboard (27) and in that said read-only memory contains coordinates for positioning said film stage to change said second microfiche and which will be fetched upon the actuation of said special key and position said film stage.

* * * * *